United States Patent [19]

Taylor et al.

[11] Patent Number: 4,993,695
[45] Date of Patent: Feb. 19, 1991

[54] FLEXIBLE STRUT ASSEMBLY

[76] Inventors: Howard W. Taylor, 308 Fifth Ave., Armstrong, Iowa 50514; Warren L. Stinar, 314 N. 18th St., Estherville, Iowa 51334; Kenneth L. McConnell, 701 Second St., Armstrong, Iowa 50514

[21] Appl. No.: 477,560

[22] Filed: Feb. 9, 1990

[51] Int. Cl.⁵ ............................ F16F 1/16; A01B 35/28
[52] U.S. Cl. ...................................... 267/70; 172/572; 172/710; 267/41
[58] Field of Search .................. 171/58; 172/518, 572, 172/705, 710, 748, 762; 267/41, 69, 70, 71, 174

[56] References Cited

U.S. PATENT DOCUMENTS

| | | | |
|---|---|---|---|
| 3,429,566 | 2/1969 | Rosendale | 267/41 X |
| 4,184,550 | 1/1980 | Ammermann | 172/710 X |
| 4,564,074 | 1/1986 | Ryan | 172/710 X |

FOREIGN PATENT DOCUMENTS 804991 8/1936 France .................................. 172/572

Primary Examiner—Duane A. Reger

[57] ABSTRACT

A flexible strut device for supporting a pair of lifter wheels for a sugar beet harvester includes a mounting bracket secured to the tool bar of the sugar beet harvester. A fixed fulcrum plate is secured to the mounting bracket and is secured to a movable fulcrum plate by connector assemblies. A flexible strut having a pair of lifter wheels journaled thereon is secured to the movable fulcrum plate. The connector assemblies include horizontally disposed compression sleeves which yieldably urge the fixed and movable plate to a normal operating position and permit the movable fulcrum plate, the flexible strut and lifter wheels to be deflected upwardly or downwardly against the bias of the compression sleeves in response to the lifter wheels striking an object, such as a stone or the like.

6 Claims, 2 Drawing Sheets

FLEXIBLE STRUT ASSEMBLY

FIELD OF THE INVENTION

This invention relates to sugar beet harvesters and, more particularly, to a flexible strut assembly for use with sugar beet harvesters.

BACKGROUND OF THE INVENTION

In sugar beet harvesters, the lifter wheels for lifting the sugar beets from the ground are attached to a strut, which is secured to the tool bar of the harvester. During the harvesting operation, the lifter wheels sometimes strike buried objects, such as rocks or the like, which exert a vertical torque on the strut, and which can result in damage to the lifter wheel assembly.

Attempts have recently been made to permit the lifter wheels and associated strut to yieldably pivot upwardly in response to striking a buried rock, to avoid damage to the assembly. For example, U.S. Pat. No. 4,137,973 discloses a lifter wheel assembly provided with coil springs positioned forwardly of the tool bar and serving to permit upward pivoting movement of the strut and lifter wheels when the latter strikes a buried rock. The lifter wheel strut is connected to a mounting bracket by a fixed pivot and underlies the tool bar. The lifter wheel assembly can pivot in only one direction with respect to its normal operating position.

SUMMARY OF THE INVENTION

It is an object of this invention to provide a novel flexible strut assembly for sugar beet harvesters, which permits limited yieldable movement of the flexible strut and lifter wheels in opposite directions from a normal operating position.

Another object of this invention is to provide a novel flexible strut assembly for sugar beet harvesters, in which yieldable compression sleeves interconnect fixed and movable fulcrum plates to permit yieldable tilting movement of the movable fulcrum plate about its upper and lower edge portions and movement of the flexible strut and lifter wheels in response to engagement of buried objects by the lifter wheels.

In carrying out the invention, the flexible strut assembly includes a mounting bracket, which is attached to the horizontal tool support bar. A fixed, substantially flat fulcrum plate is secured to the mounting bracket. A substantially flat movable fulcrum plate engages the fixed fulcrum plate and has the flexible strut and lifter wheels secured thereto. Upper and lower yieldable connector assemblies connect the fixed and movable fulcrum plates together to normally urge the flat surfaces of the plates into engaging relation during normal operation of the beet harvester. However, the yieldable connector assemblies permit the movable fulcrum plate to tilt about its upper edge portion or its lower edge portion in response to the lifter wheels striking a buried object, such as a stone or the like.

FIGURES OF THE DRAWING

DESCRIPTION OF THE PREFERRED EMBODIMENT

Figure 1:
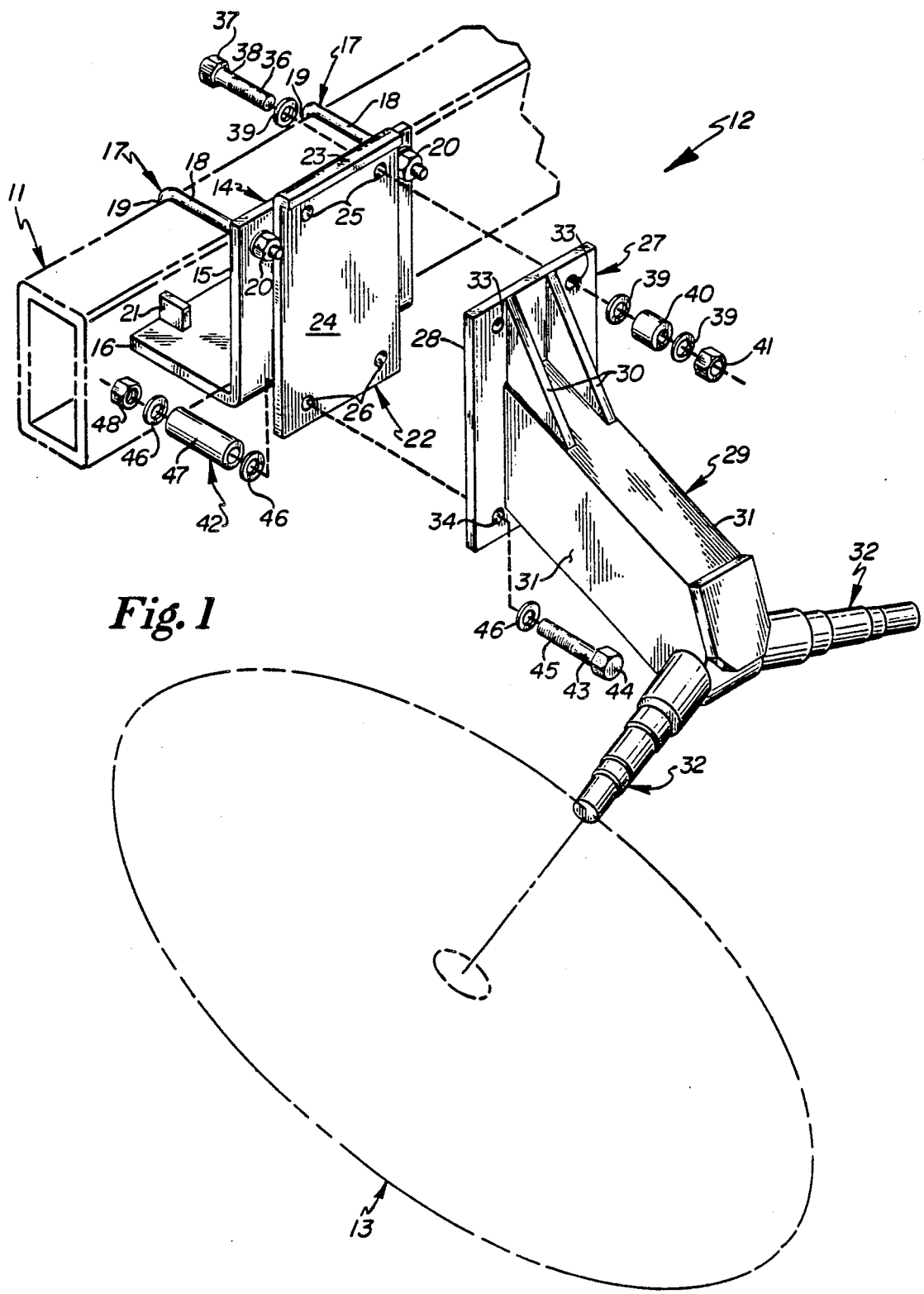
FIG. 1 is a partially exploded perspective view of the novel flexible strut assembly.

Referring now to the drawings, it will be seen that the support frame 10 for a sugar beet harvester is diagrammatically shown and is provided with a transversely extending horizontal tool bar 11 of generally rectangular cross-sectional configuration. The support frame 10 and the location of the tool bar 11 is of conventional construction for commercial sugar beet harvesters. In the embodiment shown, a novel flexible strut assembly, designated generally by the reference numeral 12, is provided and serves to support the lifter wheels 13, which are journaled thereon. The lifter wheels are of conventional construction and serve to penetrate the ground surface and lift the sugar beets from the ground in a well-known manner. It is pointed out that several flexible strut assemblies 12 will be mounted on the tool bar assembly 11 in spaced relation with respect to each other.

Each flexible strut assembly 12 includes an L-shaped mounting bracket 14, which is comprised of a vertical bracket plate 15 and a horizontal bracket plate 16. A pair of L-shaped clamping rods 17 are provided for clamping the mounting bracket 14 to the tool bar 11. Each L-shaped clamping rod 17 includes a horizontal portion 18, which is threaded at its upper end, and a vertical portion 19, which is threaded at its lower end. Suitable nuts 20, each threadedly engage one of the threaded ends of the horizontal and vertical portions of each clamping rod 17 to secure the L-shaped mounting bracket to the tool bar 11. It will be noted that the front end portion of the horizontal bracket plate 16 is provided with a pair of upwardly extending positioning elements 21, which engage the front surface of the tool bar 11. The positioning elements 21 cooperate with the vertical bracket plate 15 to properly position the bracket plate with respect to the tool bar 11.

A rectangular-shaped fixed fulcrum plate 22 is rigidly affixed to the vertical bracket plate 15 by welding or the like. It will be noted that the fixed fulcrum plate 22 is vertically disposed and is provided with a rearwardly projecting keeper element 23, which is integral therewith. The fixed fulcrum plate 22 has a rear flat surface 24 and has a pair of laterally spaced apart upper openings 25 therein adjacent the upper corners thereof and a plurality of laterally spaced apart lower openings 26 therein adjacent the lower corners thereof.

The flexible strut assembly also includes a rectangular-shaped movable fulcrum plate 27 having a substantially flat front surface 28 and being rigidly secured to the front end of a rearwardly and downwardly extending flexible strut 29. It will be noted that the flexible strut 29 is of generally rectangular cross-sectional configuration, and a pair of gussets 30 are rigidly secured to the upper surface of the strut 29 and to the rear surface of the movable fulcrum plate 27. A pair of similar stub axles 32 are rigidly affixed to the side surfaces 31 of the flexible strut 29 and project outwardly and slightly downwardly therefrom. The stub axles 32 have the lifter wheels 13 journaled thereon in a well-known manner. In this regard, the lifter wheels 13 converge downwardly, and, during forward movement of the sugar beet harvester, rotate and lift the sugar beets from the soil.

The movable fulcrum plate 27 has a pair of laterally spaced part upper openings 33 therein, which are located adjacent the upper corners thereof. The movable fulcrum plate also has a plurality of laterally spaced apart lower openings 34 therein, which are located adjacent the lower corners thereof. Means are provided for yieldably interconnecting the fixed and movable fulcrum plates together. This means includes an upper pair of connector assemblies 35, each extending through one of the openings 25 in the fixed fulcrum plate 22 and one of the openings 33 in the movable fulcrum plate 27. Each connector assembly 35 includes an elongate bolt 36 having a head 37 and a threaded shank 38 and a pair of washers or spacers 39. The shank 38 of the bolt 36 projects through an elongate yieldable compression sleeve or pad 40 and is threadedly engaged by a nut 41. It will be seen that each compression sleeve 40 is positioned rearwardly of the movable fulcrum plate 27.

The fixed and movable fulcrum plates are also interconnected by a plurality of lower connector assemblies 42, and each includes an elongate bolt 43 having a head 44 and an elongate threaded shank 45. Each bolt extends through one of the openings 26 in the fixed fulcrum plate 22 and one of the openings 34 in the movable fulcrum plate 27. Each connector assembly 42 also includes a pair of washers 46, one of which engages the front surface of the fixed fulcrum plate 22, and the other engaging the rear surface of the movable fulcrum plate 27. EAch bolt 43 also passes through an elongated yieldable compression sleeve or pad 47 and is threadedly engaged by a ut 48. It will be noted in FIGS. 1-3 that the sleeve 47 is positioned forwardly of the fixed fulcrum plate 22 and has a length dimension substantially greater than the length dimension of the yieldable compression sleeve 40. However, in FIG. 4, the sleeve 47 is positioned rearwardly of the movable fulcrum plate 27. In this regard, while it is preferred that the sleeve be positioned forwardly of the fixed fulcrum plate, the sleeve may also be positioned rearwardly of the movable fulcrum plate 27.

The compression sleeves 40 and 47 are formed of a suitable yieldable material, such as rubber or the like. In the embodiment shown, there are four lower connector assemblies.

Figure 2:
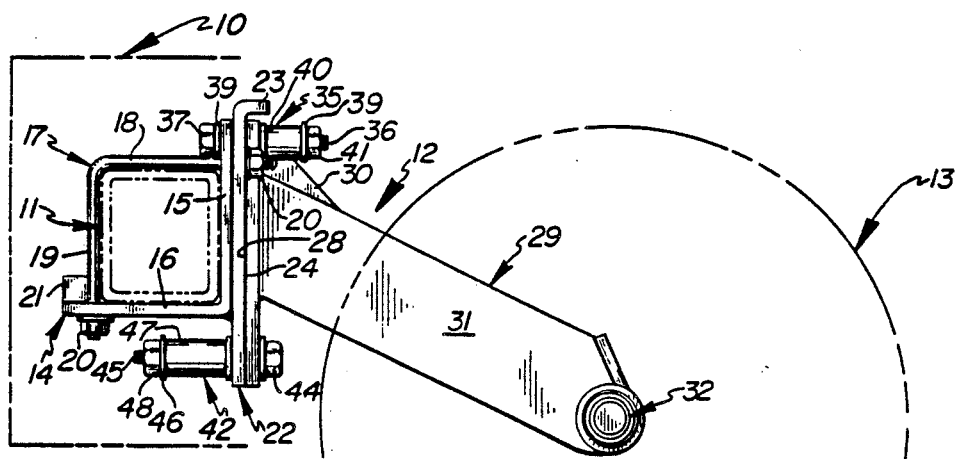
FIG. 2 is a side elevational view of the flexible strut assembly, illustrating in the assembly in a normal operating position.

In use, a plurality of the flexible strut assemblies 12 will be mounted in spaded apart relation on the tool bar 11 of a sugar beet harvester, and the pair of lifter wheels supported by each assembly will be pulled through the soil and will raise and lift the sugar beets in a well-known manner. During normal operation, the movable fulcrum plate 27 will have its flat front surface 28 disposed in engaging relation with the flat rear surface 24 of the fixed fulcrum plate 22, as best seen in FIG. 2. It will be noted that the movable and fixed fulcrum plates have substantially the same width dimension, but the fixed fulcrum plate has a slightly greater vertical dimension than the movable plate so that the keeper element 23 is spaced slightly above and overlies the upper edge of the movable fulcrum plate 27. However, the vertical edges and the lower edges of these plates are disposed in substantially coextensive relationship with each other.

Figure 3:
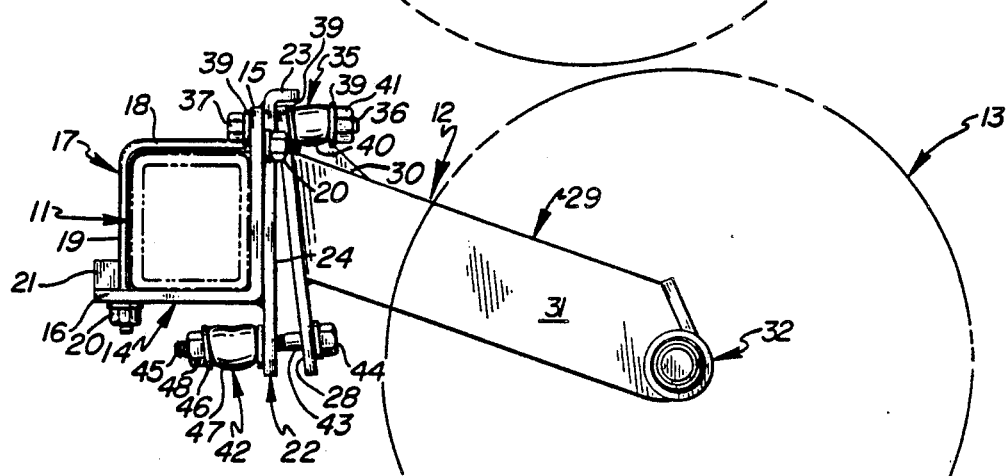
FIG. 3 is a view similar to FIG. 2, but illustrating the rear end portion of the flexible strut assembly tilted in an upward direction.
Figure 4:
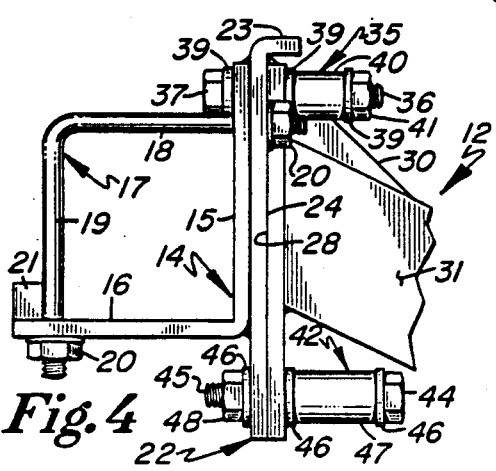
FIG. 4 is a view similar to FIGS. 2 and 3, but illustrating certain components arranged in a different manner.

If the lifter wheels 13 of a flexible strut assembly 12 strike a buried object in a manner to cause the rear end portion of the strut 29 to be deflected upwardly, the movable fulcrum plate 27 will tilt about its upper edge portion on the fixed fulcrum plate 22A. When this occurs, the compression sleeves 40 of the lower connector assemblies 42 will be compressed, as best seen in FIG. 3, thereby urging the rear end portion of the strut 29 and the associated lifter wheels downwardly towards the normal operating position. Therefore, movement of the flexible strut occurs when the resultant force exerted thereon is sufficient to overcome the bias exerted by said compression sleeves.

The upper and lower pairs of connector assemblies normally urge the flexible strut 29 and lifter wheels 13 to the operating position of FIG. 2, but cooperate with each other and with the fulcrum plate to permit limited tilting movement of the movable fulcrum plate in an upward direction, in response to engagement by the lifter wheels with an object. This particular arrangement minimizes, if not eliminates, damage to the flexible strut assembly as a result of the lifter wheels engaging objects, including buried rocks or the like.

Figure 5:
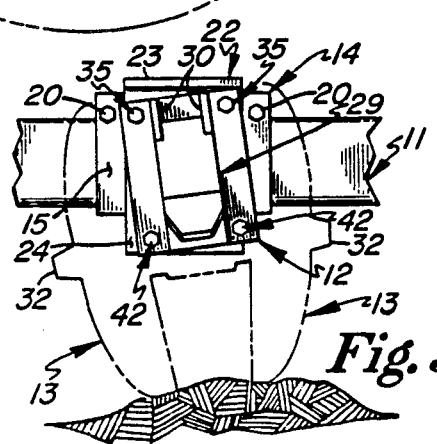
FIG. 5 is a rear end elevational view, illustrating the lateral flexing of the flexible strut.

Referring now to FIG. 5, it will be seen that the flexible strut 29 may also flex in a lateral direction in response to lifter wheels striking a buried object. This lateral flexing minimizes damage to the lifter wheels and flexible strut when a buried object exerts an unsymmetrical torque force on the lifter wheels.

Thus, it will be seen that I have provided a novel flexible strut assembly for sugar beet harvesters, which is of simple and inexpensive construction and operation, and which functions in a more efficient manner than any heretofore known comparable structure.

What is claimed is:

1. A flexible strut device for supporting the lifter wheels of a sugar beet harvester having a transversely extending horizontal tool bar, comprising:

a mounting bracket for attachment to the transversely extending horizontal support bar of the sugar beet harvester, a vertically disposed fixed fulcrum plate secured to said mounting bracket and having a substantially flat rearwardly facing fulcrum surface, an elongate flexible strut extending in a fore and aft direction, a pair of stub shafts secured to said flexible strut and extending outwardly therefrom for journaling thereon a pair of lifter wheels, a vertically disposed movable fulcrum plate secured to the front end of said flexible strut and having a substantially flat forwardly facing surface, and means yieldably connecting the fixed and movable fulcrum plates together so that the respective flat fulcrum surfaces thereof are urged into engaging relation with each other when the flexible strut assembly and lifter wheels are in a normal operating position, said yieldable connecting means permitting said movable fulcrum plate to yieldably tilt about its upper edge portion said fixed fulcrum plate when the rear end of said flexible strut is urged upwardly.

2. The flexible strut device as defined in claim 1 wherein said yieldable means comprises a plurality of yieldable sleeves formed of a compressible material.

3. The flexible strut device as defined in claim 2 wherein said yieldable sleeves are horizontally disposed.

4. The flexible strut device as defined in claim 3 wherein a plurality of said yieldable sleeves are positioned forwardly or rearwardly of said fixed fulcrum plate and a plurality of said yieldable sleeves are positioned rearwardly of said movable fulcrum plate.

5. The flexible strut device as defined in claim 3 wherein said fixed and movable fulcrum plates each have upper and lower horizontal edges, a plurality of said yieldable sleeves being positioned forwardly or rearwardly of said fixed movable plate adjacent the lower horizontal edge thereof, and a plurality of said yieldable sleeves being positioned rearwardly of said movable plate adjacent the upper edge thereof.

6. The flexible strut device as defined in claim 5 wherein said yieldable sleeves positioned forwardly or rearwardly of said fixed fulcrum plate have an axial dimension greater than said other yieldable sleeves.

* * * * *